United States Patent
Kato et al.

(10) Patent No.: US 7,431,912 B2
(45) Date of Patent: Oct. 7, 2008

(54) PRODUCING METHOD FOR ZIRCONIA HOLLOW PARTICLES

(75) Inventors: Takayuki Kato, Susono (JP); Makoto Egashira, Nagasaki (JP); Yasuhiro Shimizu, Nagasaki (JP); Takeo Hyodo, Nagasaki (JP); Miyuki Fukunaga, Nagasaki (JP)

(73) Assignee: Yazaki Corporation, Tokyo (JP)

( * ) Notice: Subject to any disclaimer, the term of this patent is extended or adjusted under 35 U.S.C. 154(b) by 373 days.

(21) Appl. No.: 11/083,984

(22) Filed: Mar. 21, 2005

(65) Prior Publication Data

US 2005/0238570 A1    Oct. 27, 2005

(30) Foreign Application Priority Data

Mar. 22, 2004    (JP)    ............ P.2004-082157

(51) Int. Cl.
   *C01G 25/02*    (2006.01)
   *B01J 2/00*     (2006.01)
   *B01J 2/12*     (2006.01)
   *C04B 14/30*    (2006.01)
   *C04B 38/06*    (2006.01)

(52) U.S. Cl. ............ 423/608; 423/266; 423/335; 501/103; 501/81

(58) Field of Classification Search ............ 423/608, 423/266, 335; 427/213.3, 222, 227; 501/103, 501/81
See application file for complete search history.

(56) References Cited

U.S. PATENT DOCUMENTS

| | | | |
|---|---|---|---|
| 4,703,806 A * | 11/1987 | Lassow et al. ............ 164/518 |
| 5,004,719 A * | 4/1991 | Deller et al. ............ 502/242 |
| 5,318,797 A * | 6/1994 | Matijevic et al. ....... 427/213.31 |
| 5,774,779 A * | 6/1998 | Tuchinskiy ............ 419/2 |
| 5,958,285 A * | 9/1999 | Kawano et al. ......... 252/62.9 R |
| 6,210,625 B1 | 4/2001 | Matsushita et al. | |
| 2003/0129320 A1* | 7/2003 | Yu ............ 427/453 |
| 2004/0033884 A1 | 2/2004 | Wallar | |
| 2004/0156724 A1* | 8/2004 | Torigoe et al. .......... 416/241 R |

FOREIGN PATENT DOCUMENTS

| | | |
|---|---|---|
| FR | 2 829 045 A | 3/2003 |
| JP | 04200739 A * | 7/1992 |
| JP | 10-258223 A | 9/1998 |

OTHER PUBLICATIONS

Chemical Abstracts + Indexes, American Chemical Society. Columbus, US, vol. 117, No. 197081r, Nov. 16, 1992, XP000352978.
Japanese Abstract No. 05330938, dated Dec. 14, 1993.
Japanese Abstract No. 02064016, dated Mar. 5, 1990.

* cited by examiner

*Primary Examiner*—Ngoc-Yen M Nguyen
(74) *Attorney, Agent, or Firm*—Sughrue Mion, PLLC

(57) ABSTRACT

A producing method for producing zirconia hollow particles in which a zirconia powder mutually combines to form a porous shell layer thereby constructing a hollow structure, the method being characterized in mixing under a pressurized contact a resin powder and a zirconia powder of a grain size smaller than that of the resin powder, thereby forming a precursor by covering a surface of the resin powder with the zirconia powder in a partially embedded state, and calcining the precursor to expel the resin powder and to mutually sinter the zirconia powder.

6 Claims, 4 Drawing Sheets

PRODUCING METHOD FOR ZIRCONIA HOLLOW PARTICLES

BACKGROUND OF THE INVENTION

1. Field of the Invention

The present invention relates to a producing method for zirconia hollow particles in which a zirconia powder mutually combines to form a porous shell layer thereby constructing a hollow structure, and more particularly to a method for obtaining zirconia hollow particles having a high mutual combining strength of zirconia powder and showing an absolutely spherical shape.

2. Related Art

A composite material formed by dispersing a ceramic powder in a matrix such as a metal is widely employed for example for the purpose of a weight reduction and a strength reinforcing. Also for a further weight reduction, there are recently utilized ceramic hollow particles in which the ceramic powder mutually combines to form an approximately spherical porous shell layer with a hollow interior. Also in light-weight components for an automobile, a weight reduction is intended by dispersing a zirconia powder, or a zirconia hollow powder in a metal.

Ceramic hollow particles have commonly been produced by covering an entire surface of a resin powder of a large size constituting a core material with a powder layer of a ceramic powder of a grain size smaller than that of the resin powder thereby forming a precursor, and eliminating the resin powder from the precursor to cause the ceramic powder to mutually combine thereby forming a porous shell layer. For example, there is known a method of producing alumina hollow particles by contacting a highly water-absorbing polymer powder in a swelled state by water absorption and an alumina powder to form a powder layer of the alumina powder on an entire surface of the highly water-absorbing polymer powder thereby forming a precursor, and drying at a high temperature or calcining the precursor thereby eliminating the highly water-absorbing polymer and constructing a hollow structure (cf. Unexamined Japanese Patent Publication Hei. 10-258223).

However, in the producing method described in the publication described above, in the precursor schematically shown in FIG. 5, an alumina powder 12 is merely attached to the surface of a resin powder 10 and is easily peeled off from the resin powder 10 at the high-temperature drying or at the calcining so that the powder layer is difficult to retain uniformly. Besides, as the resin powder 10 causes a thermal expansion or a gasification by the high-temperature drying or by the calcining, the alumina powder 12 receives an outward pressure whereby the powder layer tends to be disintegrated.

A similar situation occurs when the aforementioned producing method is applied to the preparation of zirconia hollow particles, and a uniform porous shell layer is difficult to obtain by the peeling of the zirconia powder or by the disintegration. For the purpose of further weight reduction, there are also desired fine zirconia hollow particles for example of a grain size of 20 μm or less, and a zirconia powder of submicron range has to be used for that purpose. It is further difficult to maintain a uniform powder layer and to form a satisfactory porous shell layer with such fine zirconia powder.

SUMMARY OF THE INVENTION

The present invention has been made in consideration of such situation, and an object thereof is to provide a producing method capable of forming a porous shell layer having a high mutual combining strength of zirconia powder and showing a spherical shape close to absolutory sphere, and also usable for fine zirconia hollow particles of a grain size of 20 μm or less, which are anticipated to have an increasing demand hereafter.

For attaining the aforementioned object, the present invention provides a producing method for zirconia hollow particles in which a zirconia powder mutually combines to form a porous shell layer thereby constructing a hollow structure, the method being characterized in mixing under a pressurized contact a resin powder and a zirconia powder of a grain size smaller than that of the resin powder, thereby forming a precursor by covering a surface of the resin powder with the zirconia powder in a partially embedded state, and calcining the precursor to expel the resin powder and to mutually sinter the zirconia powder.

The present invention allows to produce ceramic hollow particles having a uniform and firm porous shell layer by strong mutual combining of zirconia powder, and having a spherical shape close to the absolutory sphere. Also the producing method of the present invention is suitable also to the production of fine zirconia hollow particles of a grain size of 20 μm or less, which are anticipated to have an increasing demand hereafter.

BRIEF DESCRIPTION OF THE DRAWAINGS

DETAILED DESCRIPTION OF THE PREFERRED EMBODIMENTS

In the following, a preferred embodiment of the present invention will be explained in detail.

Figure 1:
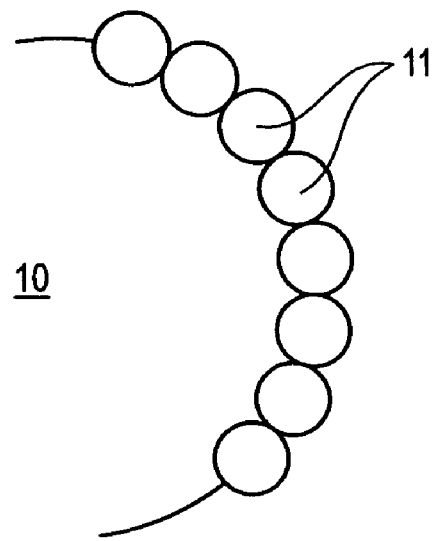
FIG. 1 is a view for explaining a producing method for zirconia hollow particles of the invention and schematically showing a precursor constituted of a resin powder and a zirconia powder.

In the producing method of the present invention for zirconia hollow particles, at first a resin powder and a zirconia powder are mixed in such a manner that they are mutually pressed, namely in a pressurized contact. Through such pressurized mixing, there is obtained, as schematically illustrated in FIG. 1, a precursor in which a surface of the resin powder 10 is covered by the zirconia powder 11 in a partially embedded state. Owing to such covering state, the zirconia powder 11 does not peel off at a subsequent calcining and the zirconia powder mutually combines while retaining a satisfactory covering state to form a uniform and firm porous shell layer constituted of the zirconia powder 11.

Figure 2:
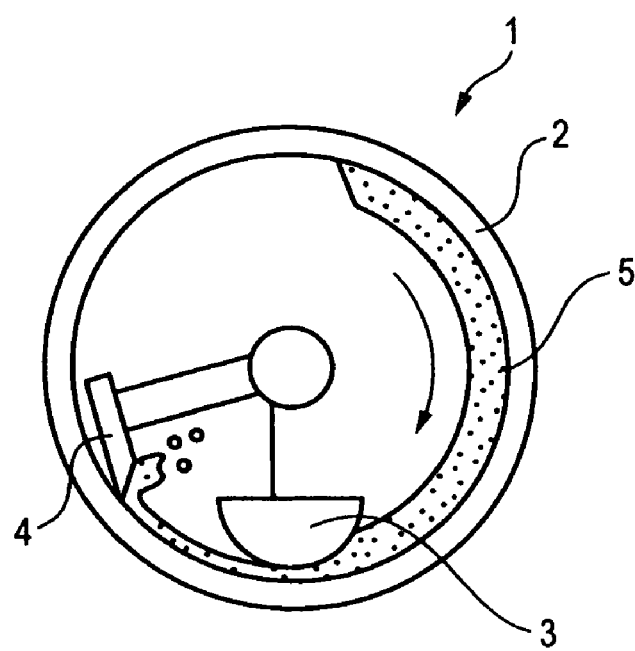
FIG. 2 is a schematic view showing a configuration of a producing apparatus adapted for use in the producing method for zirconia hollow particles of the invention.

The aforementioned pressured mixing can be realized, for example, by an apparatus schematically illustrated in FIG. 2. Such pressurized mixing apparatus 1 is essentially constituted of a drum-shaped rotatable chamber 2, and an inner member 3 and a scraper 4 provided with a predetermined distance at a central axis of the chamber. The inner member 3 has a substantially semicircular cross section on a face opposed to an inner wall of the chamber 2 in order to facilitate feeding and removal of a powder mixture 5, and forms a small gap to the inner wall of the chamber 2. As a pressurized mixing apparatus of such configuration, there is known, for example, a mechanofusion system (AM-15F, manufactured by Hosokawa Micron Co.).

At the pressurized mixing, a powder mixture 5 of a resin powder 10 and a zirconia powder 11 is charged in the chamber 2, which is then rotated at a high speed in a direction indicated by an arrow. Along such rotation, the powder mixture 5 is pressed to the internal wall of the chamber 2 by a centrifugal force. When the powder mixture 5 passes through a gap between the inner member 3 and the inner wall of the chamber 2, the resin powder 10 and the zirconia powder 11 are mutually pressurized by a shearing force, whereby a part of the zirconia powder 11 is embedded into the surface of the resin powder 10. The powder mixture 5 after passing the inner member 3 is scrape off by the scraper 4 and is repeatedly subjected to a similar process, whereby, as shown in FIG. 1, the zirconia powder 11 is partially embedded so as to cover the entire surface of the resin powder 10. An embedded amount of the zirconia powder 11 into the resin powder 10 is preferably about 50-80% of the powder volume in order to achieve a securer prevention of peeling at a high-temperature drying or a calcining, and a process time and a gap between the inner wall of the chamber 2 and the inner member 3 are suitably adjusted.

At the pressurized mixing, the chamber 2 may be heated. A heating softens the resin powder 10, thereby facilitating the embedding of the zirconia powder 11. However, as the pressing action by the inner member 3 generates a certain heat, the operation may be conducted at a normal temperature unless a reduction in the process time is particularly required.

Also a mixing ratio of the resin powder 10 and the zirconia powder 11 is not particularly restricted, and the resin powder 10 and the zirconia powder 11 may be employed, for example, in same amounts in weight, though such amount may be also influenced by the respective grain sizes.

Then the obtained precursor is calcined to gasify and expel the resin powder 10 and to mutually sinter the zirconia powder 11. In this operation, there may be employed a temperature process of charging the precursor for example in an electric oven and elevating the temperature gradually from the room temperature to execute gasification and sintering, or a temperature process of treating the precursor in an electric oven heated to a temperature at which the resin powder 10 gasifies completely and then heating to a temperature at which the zirconia powder 11 mutually combines. In particular, the latter temperature process allows to obtain the zirconia hollow particles closer to true spheres, as the resin powder 11 is instantaneously gasified and removed. Also in the latter temperature process, the treating temperature for the precursor is advantageously 700-800° C., though it is dependent on the kind of the resin powder 10.

The calcining operation provides the zirconia hollow particles of the invention, and a uniform and firm porous shell layer is formed since the zirconia powder 11 does not peel off from the resin powder 10 at the calcining operation.

The zirconia powder to be employed in the invention is preferably an yttria-stabilized zirconia. Also the resin powder 10 is preferably constituted of a soft resin, in order that the zirconia powder 11 can be embedded. For example a powder constituted for example of polystyrene, polymethyl methacrylate, polyethylene or polypropylene can be employed advantageously. Among these, polymethyl methacrylate (PMMA) is preferred as it decomposes rapidly at a lower temperature, in comparison with polystyrene (PS) or polyethylene (PE), and the residual substance is almost completely lost at about 350° C. as indicated by a result of a differential calorimetry shown in FIG. 3. Such polymethyl methacrylate powder allows, as will be shown following examples, to obtain zirconia hollow particles closer to true spheres.

A grain size of the resin powder 10 is suitably selected according to a grain size of the desired zirconia hollow particles. An object of the invention is to generate zirconia hollow particles of a grain size of 20 μm or less, and a resin powder 10 classified to a grain size of 20 μm or less is employed for such case.

Also it is preferable to mix a zirconia powder 11 and a silica powder of a grain size smaller than that of the zirconia powder 11 and to use such mixture in the pressurized mixing with the aforementioned resin powder 10. In this manner, at the pressurized mixing with the resin powder 10, the silica powder of the smaller grain size enters the gap in the zirconia powder 11 of the larger grain size, whereby a denser porous shell layer can be formed. An amount of the silica powder is preferably less than 50 wt. % in the mixture of the zirconia powder 11 and the silica powder, and, in consideration of the strength of the generated zirconia hollow particles, within a range of 3 to 20 wt. %.

In the following, the present invention will be further clarified by examples, but the present invention is not at all limited to such examples.

In a mechanofusion system (AM-15F, manufactured by Hosokawa Micron Co., cf. FIG. 2), 7.5 g of a polymethyl methacrylate powder (MR-10HG, average grain size 10 μm manufactured by Soken Chemical & Engineering Co.), 7.5 g of an yttria-stabilized zirconia powder (TZ-8Y, average grain size 0.2 μm, manufactured by Tosoh Corp.) and 0.375 g of a silica powder (Silica Fumed, average grain size 0.011 μm, manufactured by Siguma Co.) were charged, and the chamber was rotated for 30 minutes at 1,000 rpm to obtain a precursor. A gap between the inner member and the chamber was maintained at 1 mm.

The obtained precursor was placed in an electric oven heated at 700° C. to instantaneously gasify polymethyl methacrylate, then heated to 1500° C. with a temperature elevating rate of about 5° C./min, calcined by maintaining at 1500° C. for 3 hours, and then cooled to the room temperature with a cooling rate of 5° C./min.

Figure 3:
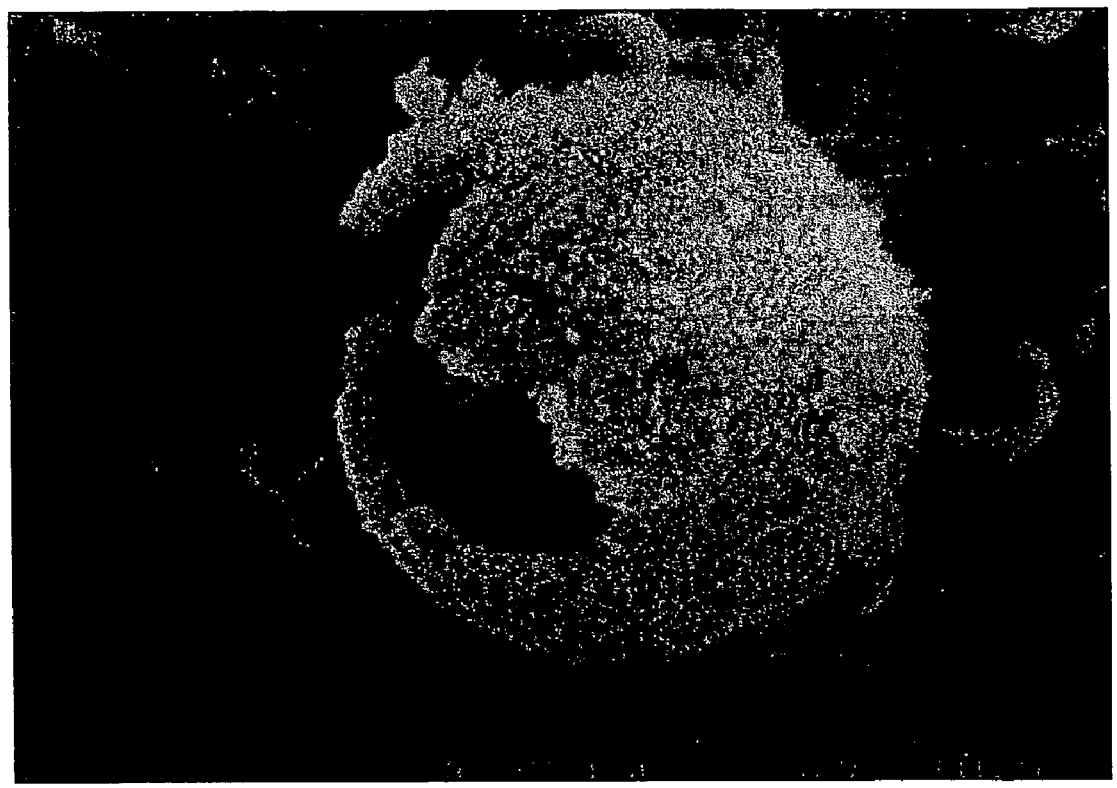
FIG. 3 is an electron photomicrograph showing a zirconia hollow particle obtained in an example, in a state immediately after a calcining.

FIG. 3 shows an electron photomicrograph of a state immediately after taking out from the electric oven. There were obtained substantially spherical zirconia hollow particles, though a partial void was present.

Figure 4:
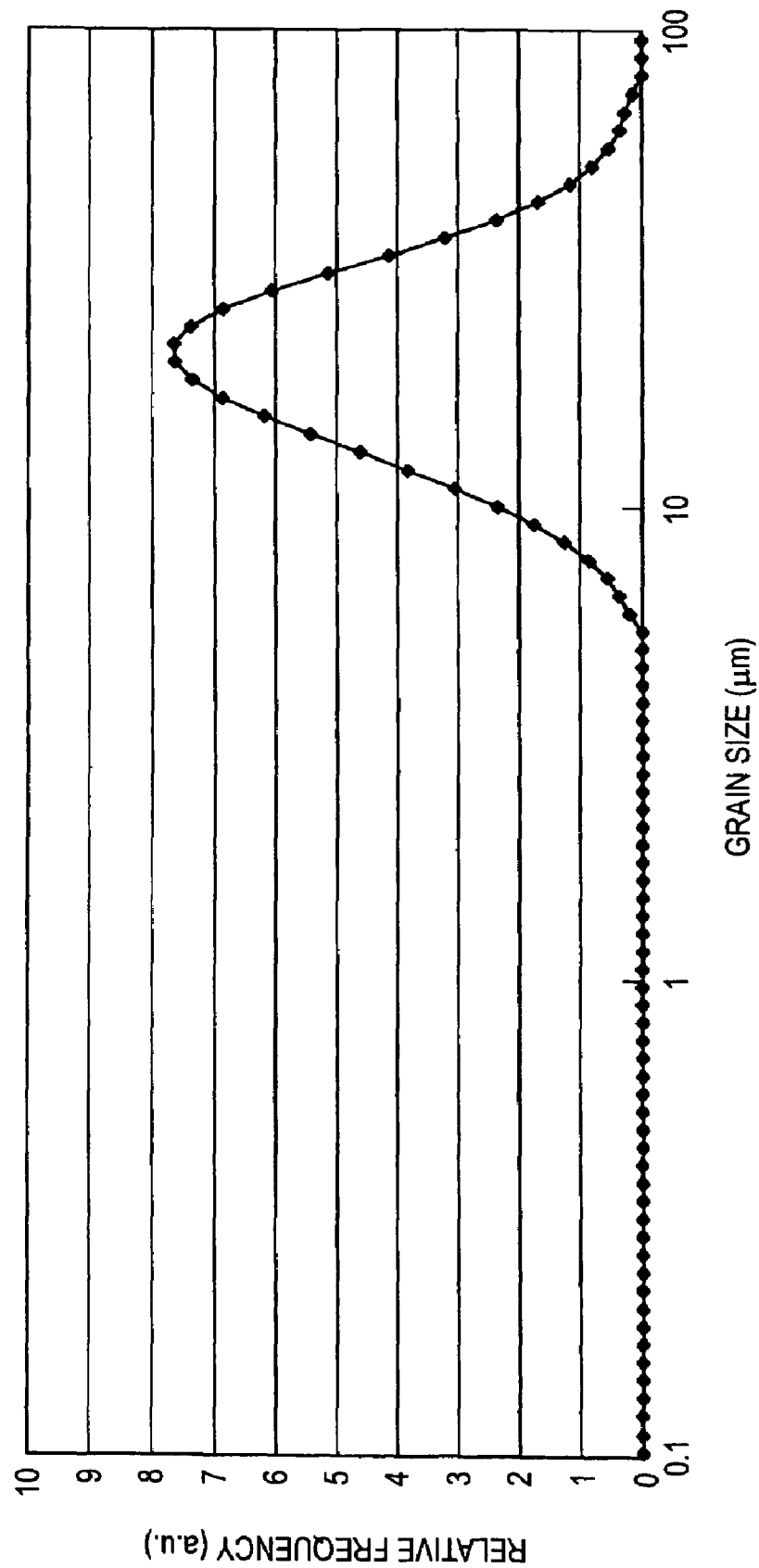
FIG. 4 is a graph showing a cumulative grain size distribution of the zirconia hollow particles obtained in the example.
Figure 5:
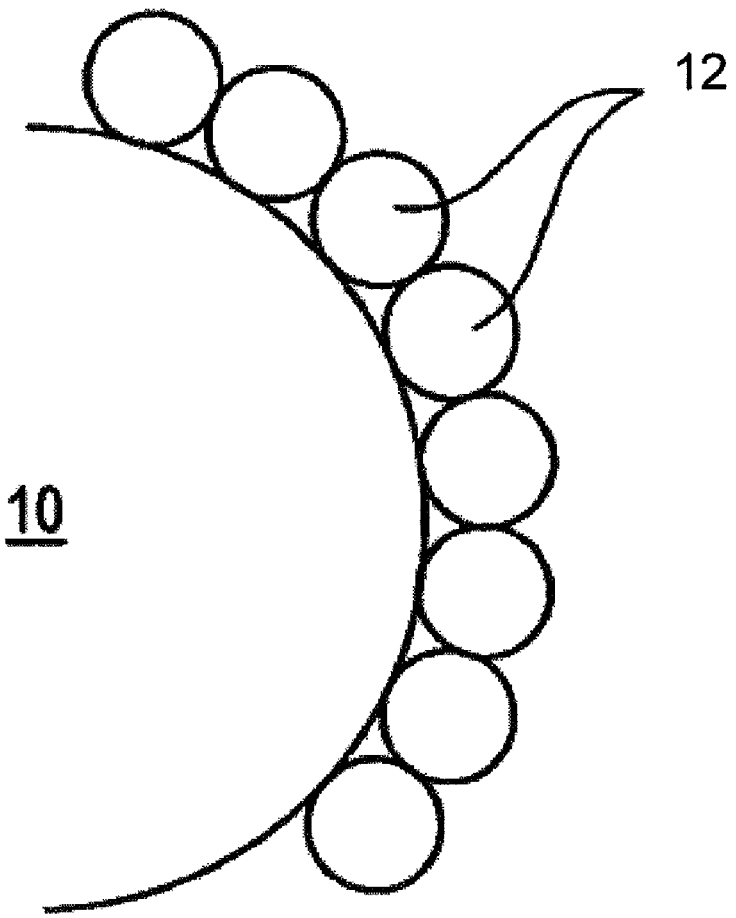
FIG. 5 is a view for explaining a prior producing method for zirconia hollow particles and schematically showing a precursor constituted of a resin powder and an alumina powder.

Also the obtained zirconia hollow particles were subjected to a grain size measurement, and a cumulative size distribution was determined. Result shown in FIG. 4 indicates that zirconia hollow particles of a uniform grain size, without large-sized particles, could be obtained.

What is claimed is:

1. A method for producing zirconia hollow particles comprising the steps of:

mixing a resin powder and a zirconia powder of a grain size smaller than a grain size of the resin powder under a pressurized contact;

forming a precursor by covering a surface of the resin powder with the zirconia powder in a partially embedded state; and calcining the precursor to remove the resin powder; and sintering the remaining zirconia powder, wherein 50-80% of the power volume is embedded in the surface of the resin power.

2. A method for producing zirconia hollow particles according to claim 1, wherein the resin powder is brought into a pressurized contact with a mixture of a zirconia powder and a silica powder of a grain size smaller than that of the zirconia powder.

3. A method for producing zirconia hollow particles according to claim 2, wherein the mixture of zirconia power and silica power comprises less than 50 wt. % of silica power.

4. A method for producing zirconia hollow particles according to claim 1, wherein the resin powder includes polymethyl methacrylate powder classified to a grain size of 20 μm or less.

5. A method for producing zirconia hollow particles according to claim 1, wherein the calcining step is conducted 700° C.-800° C.

6. A method for producing zirconia hollow particles according to claim 1, wherein the zirconia is yttria-stabilized zirconia powder.

* * * * *